United States Patent [19]

Meeks

[11] 4,352,476
[45] Oct. 5, 1982

[54] CABLE CLAMPS

[75] Inventor: Alan M. G. Meeks, Basingstoke, England

[73] Assignee: ITW Limited, Windsor, England

[21] Appl. No.: 277,354

[22] Filed: Jun. 25, 1981

[30] Foreign Application Priority Data

Jul. 1, 1980 [GB] United Kingdom ............... 8021463

[51] Int. Cl.³ ............................................. F16L 3/08
[52] U.S. Cl. ................................. 248/74 R; 24/248 R
[58] Field of Search .................. 248/74 R, 73, 74 A, 248/221.3, 221.4, 225.1, 226.2, 316 R, 205 A, 316 B; 24/248 B, 248 E, 251, 248 R

[56] References Cited

U.S. PATENT DOCUMENTS

| | | | |
|---|---|---|---|
| 848,257 | 3/1907 | Madler et al. | 24/248 R X |
| 2,971,236 | 2/1961 | Baker | 24/248 R |
| 3,363,865 | 1/1968 | Metsker | 248/316 R X |
| 3,516,631 | 6/1970 | Santucci | 248/205 A X |
| 3,565,376 | 2/1971 | Viers | 248/73 X |
| 3,588,018 | 6/1971 | Harlow | 248/73 X |

FOREIGN PATENT DOCUMENTS

| | | | |
|---|---|---|---|
| 2417270 | 9/1979 | France | 24/248 R |
| 153081 | 5/1932 | Switzerland | 24/248 R |
| 380276 | 9/1932 | United Kingdom | 24/248 R |

Primary Examiner—William H. Schultz
Assistant Examiner—Ramon O. Ramirez
Attorney, Agent, or Firm—J. R. Halvorsen; T. W. Buckman; J. M. Forsberg

[57] ABSTRACT

A cable clamp 10 comprises a base 12 and a pressure plate 36 presenting respective opposed faces 18 and 38 for clamping a ribbon cable therebetween. A lever 28 has a bearing member 30 whose ends 42 and 44 engage sockets 24 and 34 to permit the lever 28 to pivot, and thereby move the pressure plate 36 across the base 12. In the absence of a cable, the pressure plate 36 would move with a toggle action passing through a position of reduced separation between the opposed faces 18 and 38. In the presence of a cable, however, resilient arm 20 is deflected to exert a clamping pressure on the cable. The cable clamp 10 is integrally formed of a plastics material apart from a layer of double-sided adhesive tape 16 for attaching the base 12 to a workpiece.

12 Claims, 4 Drawing Figures

CABLE CLAMPS

The present invention relates to cable clamps, of the kind primarily intended for use in securely locating a ribbon cable to a flat or curved support such as a panel, the ribbon cable having a plurality of separate co-planar conductors encased in common insulation, but where in alternative uses the ribbon cable could be replaced by a plurality of separate co-planar cables, or by a plurality of separate parallel ribbon cables.

The term cable used hereinafter is intended to cover all of these possibilities.

According to the present invention, a cable clamp comprises a base and a pressure plate presenting respective opposed faces capable of lying generally parallel to one another for clamping a cable therebetween, a resilient arm overhanging both the base and the pressure plate, and a lever pivotally movable between a releasing position thereof and a clamping position thereof to cause the pressure plate, in the absence of a cable, to move across the base with a toggle action passing through a position of reduced separation between said opposed faces of the pressure plate and the base.

In the presence of a cable, however, free movement of the pressure plate is interrupted.

During pivoting of the lever from its releasing position to its clamping position, the separation between the opposed faces of the pressure plate and the base reaches a minimum, corresponding to the thickness of the cable. A further tendency for said separation to be reduced, consequent upon the toggle action, is taken up instead by a deflection of the resilient arm, apart from any slight compression of the cable.

Clearly, the thickness of the cable must be such that the resilient arm still exerts a clamping pressure on the cable, even after the lever has been fully pivoted to its clamping position, to provide resistance against the cable being inadvertently pulled from the cable clip.

To release the cable, the toggle action again requires a deflection of the resilient arm before the separation between the opposed faces of the pressure plate and the base can increase. Such a deflection of the resilient arm is readily achieved merely by pivoting the lever back from its clamping position to its releasing position.

The resilient arm and the pressure plate are preferably formed with respective sockets, for pivotally engaging with respective ends of a bearing member formed transversely to the length of the lever, and the lever is preferably joined with the resilient arm and the pressure plate by a pair of short straps.

The cable clamp may be integrally moulded of a plastics material. Indeed, as the sockets and the bearing member may be elongate in the directions of the widths of the resilient arm, the pressure plate and the lever, the cable clamp could be extruded of a plastics material. The sockets and the bearing member would then extend across the entire widths of the resilient arm, the pressure plate and the lever which in fact would also then be of the same width. However, in cutting the extrusion into appropriate lengths, care should be taken to ensure that there are no sharp corners, which could damage a cable accommodated therein.

The cable clamp may then be secured to attaching means such as the double-sided adhesive tape for attaching the cable clamp to a work piece.

Various modifications can be embodied in cable clamps according to the present invention. For example, the pressure plate can be formed with a catch with which a free end of the lever can latch when the lever is in its clamping position. This would resist inadvertent knocking of the lever to its releasing position. In another modification, the pressure plate can be formed with a tongue for locating in an aperture in the resilient arm, when the lever is in its clamping position, to help retain said opposed faces of the pressure plate and the base in a parallel relationship. In yet another modification, the pressure plate can be formed with a flange directed generally towards the base for both assisting entry of as well as resisting withdrawal of a cable from the cable clamp, the flange possibly itself latching with a catch formed on the base.

Two cable clamps, according to the present invention, will now be described, by way of example only, with reference to the accompanying drawings, in which.

Figure 1:
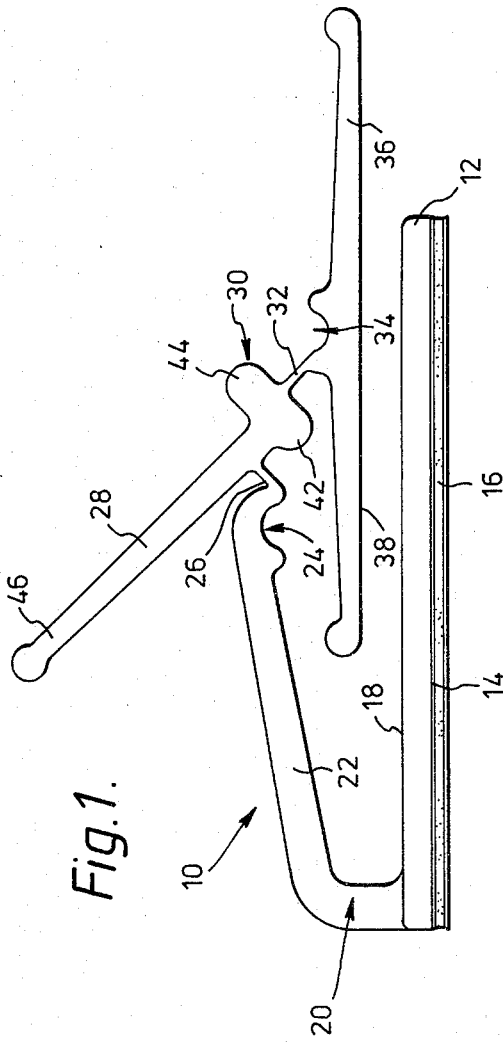
FIG. 1 is a side view of a first cable clamp according to the present invention.
Figure 2:
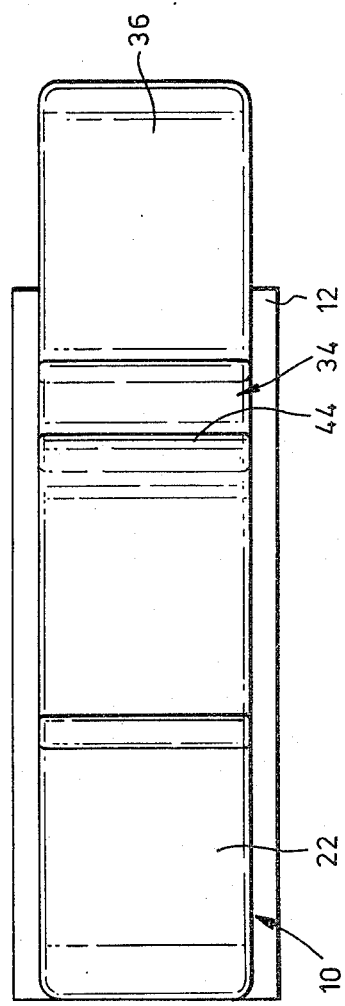
FIG. 2 is a plan view of the first cable clamp.
Figure 3:
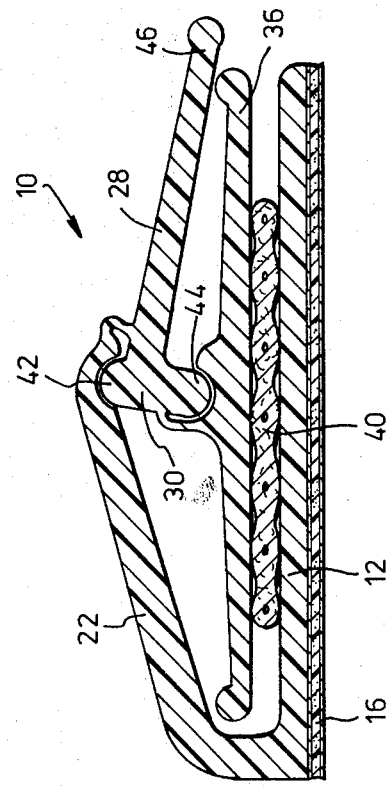
FIG. 3 is a sectional view through the first cable clamp shown clamping a ribbon cable.

A cable clamp 10 according to the present invention is shown in FIGS. 1 to 3.

The cable clamp 10 includes a planar base 12. One side of the base 12 is formed as a faying surface 14 and, before use, is preferably provided with a layer of double-sided adhesive tape 16, which permits the cable clamp 10 to be secured to a work surface. However, any other convenient attaching means could be utilised, for example a snap-fixing member could project from the faying surface 14 to snap engage in an aperture in said work surface. The faying surface 14 may be curved if said work surface is curved, but the other side of the base 12 is formed as a flat face 18.

The cable clamp 10 further includes a resilient arm 20 having a central or intermediate elongate portion 22, one end of which extends away from the base 12, with its other end overhanging the base 12, and being formed with a socket 24. A short strap 26 joins the socket 24 to a lever 28. An elongate bearing member 30 lies transversely to the length of the lever 28 and is joined by another short strap 32 to a socket 34 formed centrally of one side of a pressure plate 36. The other side of the pressure plate 36 is formed as a flat face 38. The socket 24, the bearing member 30 and the socket 34 extend respectively across the entire width of the resilient arm 20, the lever 28 and the pressure plate 36, which in fact are each of the same width.

The cable clamp 10 is integrally moulded of a plastics material, such as nylon 6.6, and is dimensioned to accommodate firmly therein a ribbon cable of up to 30 mm in width, and 3 mm in thickness.

In use, the cable clamp 10 is attached to a work surface, and a ribbon cable 40 is laid upon the flat face 18 of the base 12, the length of the ribbon cable 40 extending transversely to the length of the resilient arm 20.

The lever 28 is manipulated so that an end 42 of the bearing member 30 engages the socket 24 formed on the resilient arm 20 and an end 44 of the bearing member 30 engages the socket 34 formed on the pressure plate 36. The lever 28 is then pivoted from a releasing position to a clamping position. This causes the pressure plate 36 to move, towards the left as shown in the drawings, across the base 12.

In the absence of a cable, the pressure plate 36 would move with a toggle action passing through a position of reduced separation between the opposed flat faces 18 and 38. In the presence of a cable, however, the separation between the opposed flat faces 18 and 38 reaches a minimum, corresponding to the thickness of the cable, continued pivoting of the lever 28 towards its clamping position causing an upward deflection of the resilient arm 20. The upward deflection of the resilient arm 20 is at a maximum when the bearing member 30 lies in a direction perpendicular to the opposed flat faces 18 and 38.

As the lever 28 is pivoted beyond this position of maximum deflection of the resilient arm 20, the deflection of the resilient arm 20 will gradually decrease until the lever 28 reaches its clamping position, in which free end 46 of the lever 28 abuts the pressure plate 36.

Naturally, the thickness of the cable 40 must be such that, even when the lever 28 is in its clamping position, the resilient arm 20 still continues to exert a clamping force on the cable 40, thereby firmly sandwiching the cable between the opposed flat faces 18 and 38.

To release the cable, from the cable clamp 10, it is merely necessary to pivot the lever 28 in the opposite sense, from its clamping position to its releasing position.

Figure 4:
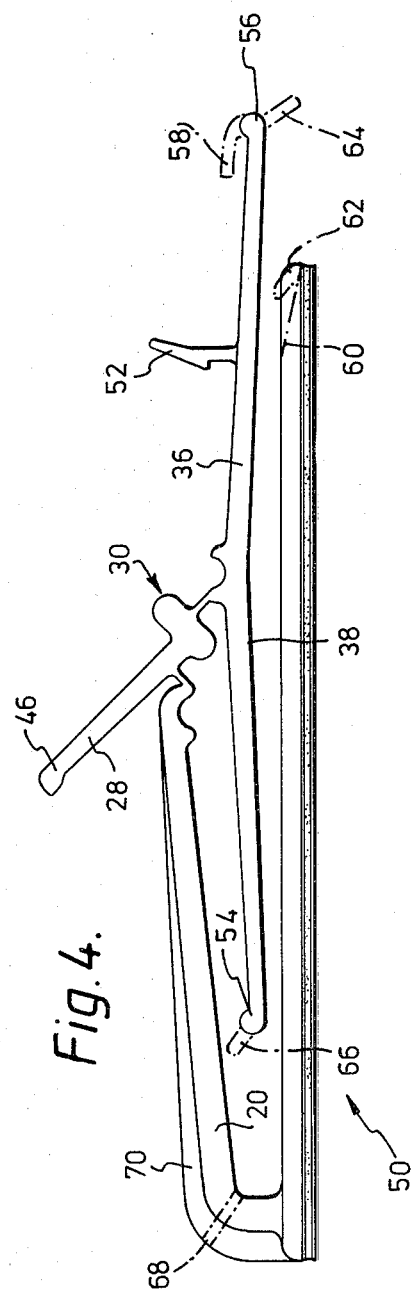
FIG. 4 is a side view similar to FIG. 1 but of a second cable clamp according to the present invention also indicating in dotted outline various modifications.

Another cable clamp 50 according to the present invention is shown in FIG. 4. The cable clamp 50 is in many respects similar to the cable clamp 10. The cable clamp 50 is, however, dimensioned to accommodate therein a ribbon cable of up to 64 mm width, and 3 mm maximum thickness.

A catch 52 extends from the same side of the pressure plate 36 as the socket 34 and can latch with the free end 46 of the lever 28 when the lever 28 is in its clamping position.

Although in its unstressed condition the face 38 of the pressure plate 36 is slightly curved, as shown, the face 38 is flattened in use because of the clamping pressure exerted by the resilient arm 20. Leading and trailing edges 54 and 56, respectively, of the pressure plate 36 are thus deformed to exert themselves a clamping pressure on the cable.

Various modifications have been indicated in dotted outline on FIG. 4.

The catch 52 could be replaced by a catch 58 formed at the trailing edge 56 of the pressure plate 36. With either catch, the lever 28 may assume a curved form when latched in its clamping position. The base 12 could be formed with a sloping cam surface 60 assisting lead-in of a ribbon cable to be retained. Alternatively, the base 12 could itself be formed with a catch 62 for latching with a flange 64 at the trailing edge 56 of the pressure plate 36 when the lever 28 is in its clamping position. The flange 64 can assist location of the cable, during pivoting of the lever 28 to its clamping position, as well as resist subsequent inadvertent withdrawal of the cable. The leading edge 54 of the pressure plate 36 may be formed with a tongue 66 which, during movement of the pressure plate 36 to the left as shown in FIG. 4 across the base 12, tends to lift the resilient arm 20. When the lever 28 is in its clamping position, only a minimal moment would be exerted on the resilient arm 20 by the tongue 66. Indeed, the tongue 66 could be accepted in a complementary aperture 68 formed in the resilient arm 20 thus helping to retain the opposed faces 18 and 38 in their required flat, parallel configuration.

With cable clamps of relatively large width, it is desirable for the resilient arm to be reinforced by a central web 70.

One or both of the flat faces 18 and 38 could in fact be roughened or slightly grooved to improve resistance to inadvertent removal of a cable.

I claim:

1. A cable clamp comprising a base and a pressure plate presenting respective opposed faces capable of lying generally parallel to one another for clamping a cable therebetween, a resilient arm joined at one end to said base and overhanging both the base and the pressure plate, a lever joined to the other end of said resilient arm and to said pressure plate pivotally movable between a releasing position and a clamping position for moving said pressure plate, in the absence of a cable, relative to the base with a toggle action, through a position of reduced separation between said opposed faces of the pressure plate and the base, said resilient arm and said pressure plate are formed with respective sockets for pivotally engaging with respective ends of a bearing member formed transversely to the length of the lever.

2. A cable clamp according to claim 1, in which the sockets and the bearing member are elongate in the directions of the widths of the resilient arm, the pressure plate and the lever.

3. A cable clamp according to claim 1, in which the resilient arm, the pressure plate and the lever are the same width.

4. A cable clamp according to claim 3, in which the sockets and the bearing member are elongate in the directions of the widths of the resilient arm, the pressure plate and the lever and extend across the entire widths of the resilient arm, the pressure plate and the lever.

5. A cable clamp according to claim 1, in which the lever is joined with the resilient arm and the pressure plate by a pair of short straps.

6. A cable clamp according to claim 1, in which the pressure plate is formed with a catch with which a free end of the lever latches, when the lever is in its clamping position.

7. A cable clamp comprising a base and a pressure plate presenting respective opposed faces capable of lying generally parallel to one another for clamping a cable therebetween, a resilient arm joined at one end to said base and overhanging both the base and the pressure plate, a lever joined to the other end of said resilient arm and to said pressure plate pivotally movable between a releasing position and a clamping position for moving said pressure plate, in the absence of a cable, relative to the base, with a toggle action, through a position of reduced separation between said opposed faces of the pressure plate and the base, said pressure plate including a leading edge formed with a tongue directed towards the resilient arm.

8. A cable clamp according to claim 7, in which the tongue is received by a locating aperture in the resilient arm, when the lever is in its clamping position.

9. A cable clamp comprising a base and a pressure plate presenting respective opposed faces capable of lying generally parallel to one another for clamping a cable therebetween, a resilient arm joined at one end to said base and overhanging both the base and the pressure plate, a lever joined to the other end of said resilient arm and to said pressure plate pivotally movable between a releasing position and a clamping position for moving said pressure plate, in the absence of a cable, relative to the base, with a toggle action, through a position of reduced separation between said opposed faces of the pressure plate and the base, said pressure plate including a trailing edge formed with a flange directed towards the base.

10. A cable clamp according to claim 9, in which the flange latches with a catch formed on the base, when the lever is in its clamping position.

11. A cable clamp according to claim 1, 7 or 9 which is integrally formed of a plastics material.

12. A cable clamp according to claim 1, 7 or 9 having attaching means for use in attaching the cable clamp to a workpiece.

* * * * *